United States Patent
Tarantini

(10) Patent No.: US 10,212,948 B2
(45) Date of Patent: Feb. 26, 2019

(54) MACHINE FOR PRODUCING "CARTELLATE"

(71) Applicant: CARTELLATA S.R.L.S., Ginosa (TA) (IT)

(72) Inventor: Giuseppe Tarantini, Ginosa (IT)

(73) Assignee: CARTELLATA S.R.L.S., Ginosa (TA) (IT)

(*) Notice: Subject to any disclaimer, the term of this patent is extended or adjusted under 35 U.S.C. 154(b) by 112 days.

(21) Appl. No.: 15/316,229

(22) PCT Filed: May 28, 2015

(86) PCT No.: PCT/IB2015/054026
§ 371 (c)(1),
(2) Date: Dec. 5, 2016

(87) PCT Pub. No.: WO2015/186030
PCT Pub. Date: Dec. 10, 2015

(65) Prior Publication Data
US 2017/0164625 A1     Jun. 15, 2017

(30) Foreign Application Priority Data

Jun. 6, 2014  (IT) .................................. BA14A0036

(51) Int. Cl.
| | |
|---|---|
| *A21C 11/00* | (2006.01) |
| *A21C 9/08* | (2006.01) |
| *A21C 11/02* | (2006.01) |
| *A21C 11/04* | (2006.01) |

(52) U.S. Cl.
CPC .............. *A21C 9/088* (2013.01); *A21C 11/00* (2013.01); *A21C 11/02* (2013.01); *A21C 11/04* (2013.01)

(58) Field of Classification Search
CPC ............. A21C 9/08; A21C 11/04; A21C 11/00
USPC .............................. 99/349, 353, 450.2, 450.1
See application file for complete search history.

(56) References Cited

U.S. PATENT DOCUMENTS

| | | | | |
|---|---|---|---|---|
| 3,616,765 A | * | 11/1971 | Griner .................... | A21C 9/088 99/450.2 |
| 4,582,472 A | * | 4/1986 | Hanson .................. | A21C 9/088 425/139 |
| 6,268,005 B1 | * | 7/2001 | Brewer .................... | A21C 3/02 242/412.1 |

(Continued)

FOREIGN PATENT DOCUMENTS

| | | |
|---|---|---|
| EP | 2719282 A1 | 4/2014 |
| WO | WO 2013/128319 A1 | 9/2013 |

*Primary Examiner* — Dana Ross
*Assistant Examiner* — Lawrence H Samuels
(74) *Attorney, Agent, or Firm* — R. Ruschena Patent Agent, LLC

(57) ABSTRACT

A machine (100) for "cartellate" production comprising a support structure (1), a motorized conveyor belt (3) for transport of dough strips, on which dough guide means (8) operate, conveyor means (5), motorized pinching means (6), shaping means (7), cutting means (9) and movable rolling means (10); said pinching means (6) being configured to operate, by rotating around its central axis, the clamping of the dough strips; said pinching means (6) cooperating with said conveyor means (5) and with said shaping means (7) achieving the dough strips forming; said cutting means (9) being steadily fixed to one of said pinching means (6).

7 Claims, 2 Drawing Sheets

(56) References Cited

U.S. PATENT DOCUMENTS

| | | | | |
|---|---|---|---|---|
| 2010/0159095 A1* | 6/2010 | Suski | ............... | A21C 11/04 |
| | | | | 426/383 |
| 2011/0097467 A1* | 4/2011 | Van Blokland | ........ | A21C 9/088 |
| | | | | 426/496 |
| 2014/0106018 A1* | 4/2014 | Vargas | ................ | A21C 9/063 |
| | | | | 425/406 |
| 2014/0186506 A1* | 7/2014 | Kato | ................ | A21C 9/088 |
| | | | | 426/500 |

* cited by examiner

MACHINE FOR PRODUCING "CARTELLATE"

RELATED APPLICATIONS

This application is the U.S. National Stage under 35 USC 371 of PCT Application PCT/IB2015/054026. and claims foreign priority based of Italian patent application BA2014A000036 filed on Jun. 6, 2014.

BACKGROUND OF THE INVENTION

1. Field of the Invention

The present invention relates to a new machine for the production of "cartellate". In particular, said machine is able to realize accurately all the steps which reproduce the skillful manual production of "cartellate" by means of a specific working procedure.

2. Brief Description of the Prior Art

As it is known at the state of the art, the "cartellate" are typical cakes coming from Apulia and produced also in the neighbouring regions. The classical preparation process is typically carried out manually and both the recipe and the preparation procedure of the same is handed down from generation to generation.

The classical preparation occurs by making scalloped strips of a thin dough pastry (in the following scalloped strips of dough) obtained with flour, oil and white wine, which is joined and wrapped on oneself to form a sort of choreographic "rose" with recesses and holes, which will be then fried in plenty of oil. The most important part of the preparation of the "cartellata" is in fact the characteristic folding of a scalloped strip of dough of determined length which has to be pinched in more points at regular intervals, by making the dough adhere well so that many little open recesses are obtained on the whole length of the dough strip. Starting then from the end of the pinched strip, the same is rolled on itself so that the "rose" shape is provided.

There exist many variants of "cartellate", but the typical regional recipe is the one in which they are soaked with warm vincotto or honey, and then covered with cinnamon, icing sugar or almonds. The vincotto is a condiment provided by cooking the must of the grapes from Salento or figs. In other variants there is chocolate instead of vincotto, or simply icing sugar. Once prepared, they are kept in great pans, far from light and indoor.

The manual preparation times of "cartellate" are normally variable according to the result intended to be obtained, but they are definitely long. They are about 4 hours to obtain about 50-60 pieces from one kilogram of dough. In this case, it is a not excellent product, with dough thickness equal to about 1 mm. If one wants to obtain a better quality it occurs to work the dough to 0.5 mm thickness and in this way it is possible to obtain about 100-120 pieces for kilogram of dough. In this case, the times for the product preparation, always related to kilogram of dough, can exceed six hours.

As it can be observed, these are important times which make the preparation of "cartellate" difficult on a greater scale. But, on the other hand, there exist no machines able to reproduce, in each step, the manual preparation procedure of such product. Therefore, there exists the need to automatize the production of "cartellate", passing from a manual preparation procedure to an industrial "production" procedure of the same.

SUMMARY OF THE INVENTION

Therefore, aim of the present invention is to provide a new machine for producing "cartellate" which allows to reproduce optimally each step of the manual procedure with a huge time saving and with optimum quality.

Another aim of the present invention is to provide, by using said machine, a specific working procedure in order to have a final product "as handmade".

The machine for producing "cartellate" has the features claimed in the independent claim of product. The procedure for working and producing "cartellate", used thanks to the new machine, has the features claimed in the independent claim of method.

The dependent claims describe other aspects of the machine.

BRIEF DESCRIPTION OF THE DRAWINGS

The different embodiments of the invention will be now described as a way of example with reference to the appended drawings, in which.

DETAILED DESCRIPTION OF THE PREFERRED EMBODIMENTS

Figure 1:
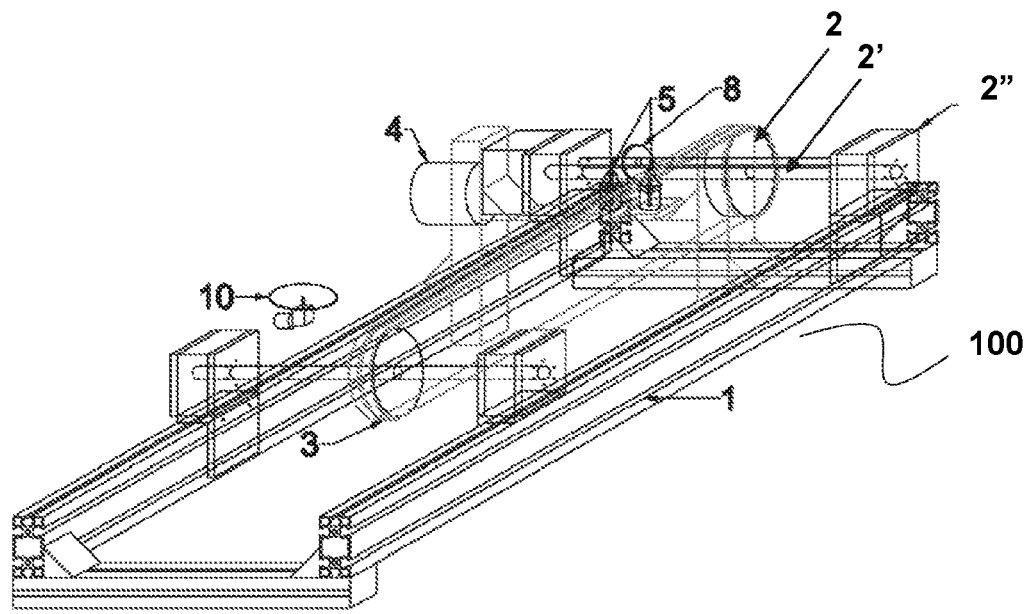
FIG. 1 shows a scheme of the basic structure of the machine for producing "cartellate" according to an embodiment of the present invention.
Figure 2:
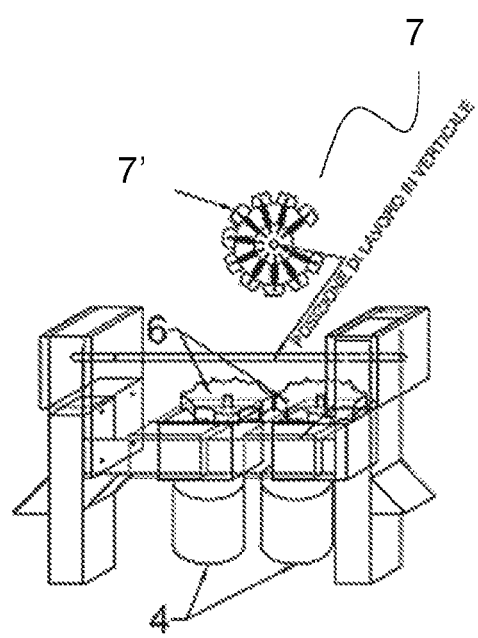
FIG. 2 shows a detail of the pinching means and shaping means of the machine for the preparation of "cartellate" of FIG. 1.

As it is shown in FIG. 1, the machine 100 for producing "cartellate" is provided with a support structure 1 and a motorized conveyor belt 3 which advances thanks to the rotation of a couple of pulleys or gears or other similar transmission organs 2. The transmission organs rotate on suitable shafts 2' suitably supported at the ends by support means 2'. The machine further comprises other means operating in sequence on the dough strips: conveyor means 5, pinching means 6 suitably moved by respective motors 4, shaping means 7, dough guide means 8, at least a cutting means 9 and a mobile rolling means 10 to roll the dough strips. All these means will be better described in the following, along with the working procedure.

Figure 4:
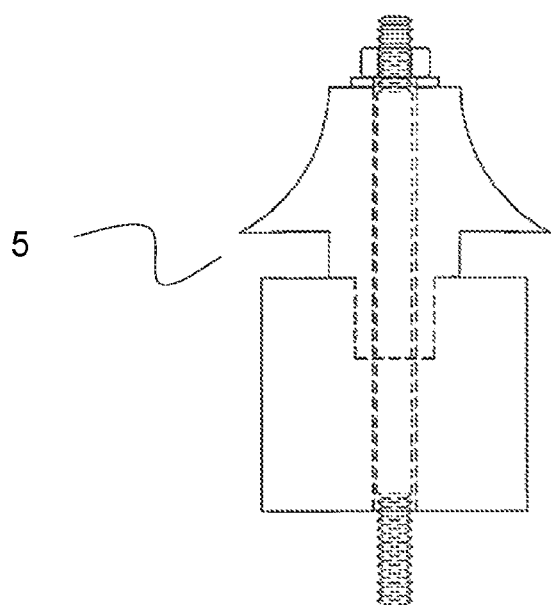
FIG. 4 is a detail of the conveyor means.

The raw material used for the production of "cartellate" is the dough pastry, or better, a dough strip, scalloped, worked by means yet available on the market. The worked dough strip is positioned on the conveyor belt 3 and a guide means 8, for example a disc, guides the same along a predetermined direction and with an advancement speed adjustable according to the production needs. The machine core consists in the elements which form and pinch the scalloped strip at the same time and which, in the following, cut them to length. In fact firstly two conveyor means 5, for example rollers, as shown in FIG. 4, positioned on both sides of the conveyor belt, lift the edges of the scalloped strip thus simplifying the next step of folding and pinching the dough in more points. The conveyor rollers 5, in practice, realize a first step of strip forming. In the following, the machine carries out the pinching of the dough strip in more points. The pinching is carried out by pinching means 6, for example two counter-rotating discs, each one provided with a plurality of projections 6', and consists in folding the dough strip to half and in carrying out little pinchings, at regular interval, along the whole length of the scalloped strip. In the same step, a shaped matrix 7' of a shaping means 7 penetrates the dough strip inside the lifted and folded edges, synchronously with the pinching discs, thus ending the forming. The shaping means 7 can be made up of a wheel bearing a plurality of angularly equidistant shaped matrices 7'. In the following, a cutting means 9, for example a blade integral to the pinching disc, cuts the dough to a predetermined length. Finally, a mobile rolling means 10, for example a mobile disc, rolls the cut and pinched dough strip thus realizing the famous "rose" shape, typical of the "cartellata".

Figure 3:
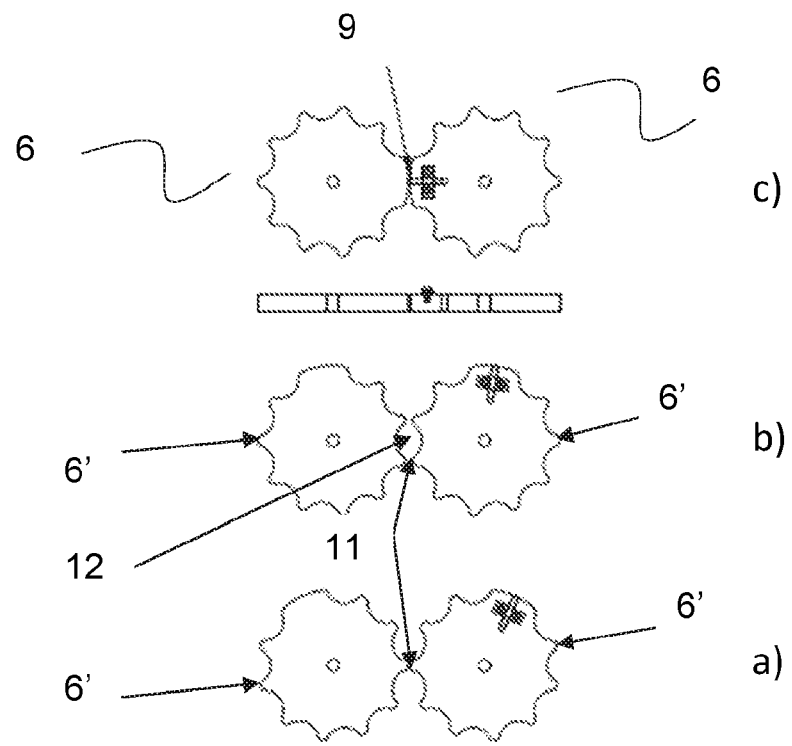
FIG. 3 shows another detail of the pinching means and cutting means of the machine of FIG. 1.

Specifically, in FIG. 3, going from bottom to the top, it is possible to follow the pinching, forming and cutting steps of the scalloping strip. The pinching means 6, in a preferred configuration, are two pinching discs, moved by motors 4 provided with stabilized variable speed reduction gear, and provided with corresponding shaped projections 6' which realize the narrow section 11 by means of which the strip undergoes the pinching. This is shown in FIG. 3a. The pinching is carried out at regular intervals each time a projection of a disc is at a projection of the other disc. Between two consecutive pinchings, i.e. between two consecutive couples of projections 6' (see FIG. 3b) there forms a section 12, greater than the narrow section 11, inside which a shaped matrix 7' of the shaping means 7 penetrates. As yet said, the shaping means 7 can comprise a wheel bearing a plurality of shaped matrices 7', which penetrate in rotational synchrony the section 12. In this way it is realized the dough strip forming with uniform and constant dimensions.

Advantageously, the number of projections 6' and the number of shaped matrices 7' are coordinated with respect to each other: n the first one, n+1 the second one. In this way it is sufficient to move the pinching discs 6, while the wheel of the shaped matrices 7' is driven by the pulses that the projections 6' will give to the corresponding shaped matrices 7', in practice as it occurs in the gear between a driving gear and a driven gear. In FIG. 3c it is shown a detail of the cutting means 9. Advantageously, said means comprise a blade positioned on one of the pinching discs and in rotation therewith. The blade, in practice, is arranged on the pinching mean instead of a projection 6'. At the end of a complete rotation of the disc, in which the above described pinching and shaping steps are alternated, the blade cuts the segment of the pinched and formed strip which makes up the linear development of the "cartellata".

In the dimensioning of the machine, it is also important to coordinate the advancement speed of the conveyor belt 3 with the rotation speed of the pinching discs 6, so that at each full rotation of the discs, when the strip is cut to length, the same strip is advanced linearly of the useful dimension in order to carry out the rolling and to realized the "rose" shape of the "cartellata". The values of the advancement speed of the belt and rotation of the pinching discs are such that it is possible to realize about 100 pieces (corresponding to a kilogram of dough) in 15-20 minutes.

According to another aspect, the present invention relates also to a specific working and production method of the "cartellate" by means of the machine 100. The method comprises the flowing steps: positioning the dough scalloped strip on the conveyor belt 3;
activating the conveyor belt along a predetermined direction, wherein the dough scalloped strip is kept in position by a guide means 8;
lifting the side edges of the dough strip by means of conveyor rollers 5 to favour the half folding of the same strip and the next pinching step;
pinching and forming the strip carried out by pinching means 6 and shaping means 7 in more points;
cutting the strip to a predetermined length carried out by cutting means 9,
rolling the strip carried out by a mobile means 10 thus realizing a "rose" shape.

Therefore the method is characterized in that, thanks to the synchronism between the pinching discs and the shaping means, the pinching and shaping steps are carried out simultaneously, alternating with respect to each other during the movement of the dough strip.

In addition to the embodiments of the invention, as above described, it is to be intended that there exist many other variants. Further, it is to be intended that said embodiments are only example and do not limit the object of the invention and its possible application or configurations. On the contrary, even if the above described description allows the experts in the field to carry out the present invention at least according an embodiment thereof, it is to be intended that many variations of the elements above described are possible without departing from the object of the invention, encompassed by the appended claims, literally interpreted and/or according to legal equivalents thereof.

The invention claimed is:

1. A machine (100) for "cartellate" production comprising:
   a support structure (1),
   a motorized conveyor belt (3) for transport of dough strips, on which a dough guide means (8) operate,
   conveyor means (5),
   motorized pinching means (6),
   shaping means (7),
   cutting means (9),
   movable rolling means (10),
   and wherein said pinching means (6) are configured to operate, by rotating around its central axis, clamping the dough strips;
   and wherein said pinching means (6) cooperate with said conveyor means (5) and with said shaping means (7) to achieve dough strips forming;
   and wherein said cutting means (9) are steadily attached to one of said pinching means (6).

2. The machine (100) according to claim 1, wherein said pinching means (6) are made of two counter rotating plates, each of them provided with a plurality of protrusions (6') configured to realize small staples, regularly spaced, along the dough strips length.

3. The machine (100) according to claim 1, wherein said shaping means (7) comprise a wheel which carries a plurality of shaped matrices (7), each other angularly equidistant, configured to penetrate the dough strips into raised and folded edges, synchronously with the pinching plates, between two consecutive pairs of corresponding projections.

4. The machine (100) according to claim 2, wherein said plurality of protrusions (6') is one unit lower than to the number of shaped matrices (7).

5. The machine (100) according to claim 1, wherein said conveyor means (5) are two rollers, positioned at the two sides of the conveyor belt (3) and configured to lift the edges of the dough strips.

6. The machine (100) according to claim 1, wherein said cutting means (9) is a blade steadily attached to one pinching means (6).

7. The machine (100) according to claim 1, wherein said pinching means (6) are driven by motors (4) equipped with a stabilized variable speed reducer.

\* \* \* \* \*